United States Patent [19]

Moskau

[11] 4,441,437

[45] Apr. 10, 1984

[54] PROCESS FOR THERMIC TREATMENT OF SLUDGES, PARTICULARLY TREATMENT OF CLARIFICATION SLUDGES

[75] Inventor: Gerhard Moskau, Saarbruecken-Dudweiler, Fed. Rep. of Germany

[73] Assignee: Saarberg-Fernwarme GmbH, Saarbrucken, Fed. Rep. of Germany

[21] Appl. No.: 314,331

[22] Filed: Oct. 23, 1981

Related U.S. Application Data

[63] Continuation of Ser. No. 173,257, Jul. 29, 1980, abandoned, which is a continuation of Ser. No. 965,303, Dec. 1, 1978, abandoned.

[30] Foreign Application Priority Data

Dec. 1, 1977 [DE] Fed. Rep. of Germany ....... 2753537

[51] Int. Cl.³ .......................... F23C 5/00; F23G 7/00
[52] U.S. Cl. .................................... 110/346; 110/238; 210/751; 210/758; 210/774; 48/197 A; 159/1 RW; 159/5; 159/47.3; 159/49; 159/48.2; 60/648; 203/22
[58] Field of Search ............... 210/758, 751, 761, 774, 210/175, 180, 181, 182, 183; 252/323; 60/640; 48/197 A, 209; 159/1 RW, 5, 47 WL, 46, 49, 48 L; 201/2, 5, 13, 14; 203/22, 25; 110/221, 224, 346, 238

[56] References Cited

U.S. PATENT DOCUMENTS

| | | | |
|---|---|---|---|
| 2,062,025 | 11/1936 | Harrington | 110/346 |
| 2,903,425 | 9/1959 | Zimmermann | 210/774 |
| 3,236,766 | 2/1966 | Levin | 71/12 |
| 3,714,911 | 2/1973 | Pradt | 110/346 |
| 3,808,126 | 4/1974 | Pradt | 210/774 |
| 3,912,577 | 10/1975 | Akune | 159/47 WL |
| 3,926,129 | 12/1975 | Wall | 110/224 |
| 4,013,516 | 3/1977 | Greenfield | 210/774 |
| 4,013,560 | 3/1977 | Pradt | 210/774 |
| 4,073,242 | 2/1978 | Wagner | 110/221 |
| 4,119,538 | 10/1978 | Yamauchi | 71/25 |
| 4,132,640 | 1/1979 | Filzmoser | 210/774 |
| 4,141,829 | 2/1979 | Thiel | 210/774 |

FOREIGN PATENT DOCUMENTS

1810975 6/1970 Fed. Rep. of Germany ...... 110/221
555786 11/1974 Switzerland .

OTHER PUBLICATIONS

Treating Chemical Wastes by Evaporation, Stickney, Chemical Engineering Progress, Apr. 1976, 41–46.
Lehr-und Handbuch der Abwassertechnik, 1969, 13, 14, 164–171.

*Primary Examiner*—Ernest G. Therkorn
*Attorney, Agent, or Firm*—James C. Wray

[57] ABSTRACT

In a process for the utilization of the heat content of combustible components in sludges, in particular in clarification sludges, the sludge, which still contains a proportion of water, is burnt in a pressure-tight furnace. The resulting steam and exhaust gases are conducted through heat exchangers and a thin layer evaporator, and the exhaust heat and heat of condensation effect, in one or more stages, a heating and thickening of the sludge to be burnt. Pressure-drop machines can be driven by the excess pressure of the exhaust gases, steam circuits and liquid circuits.

2 Claims, 1 Drawing Figure

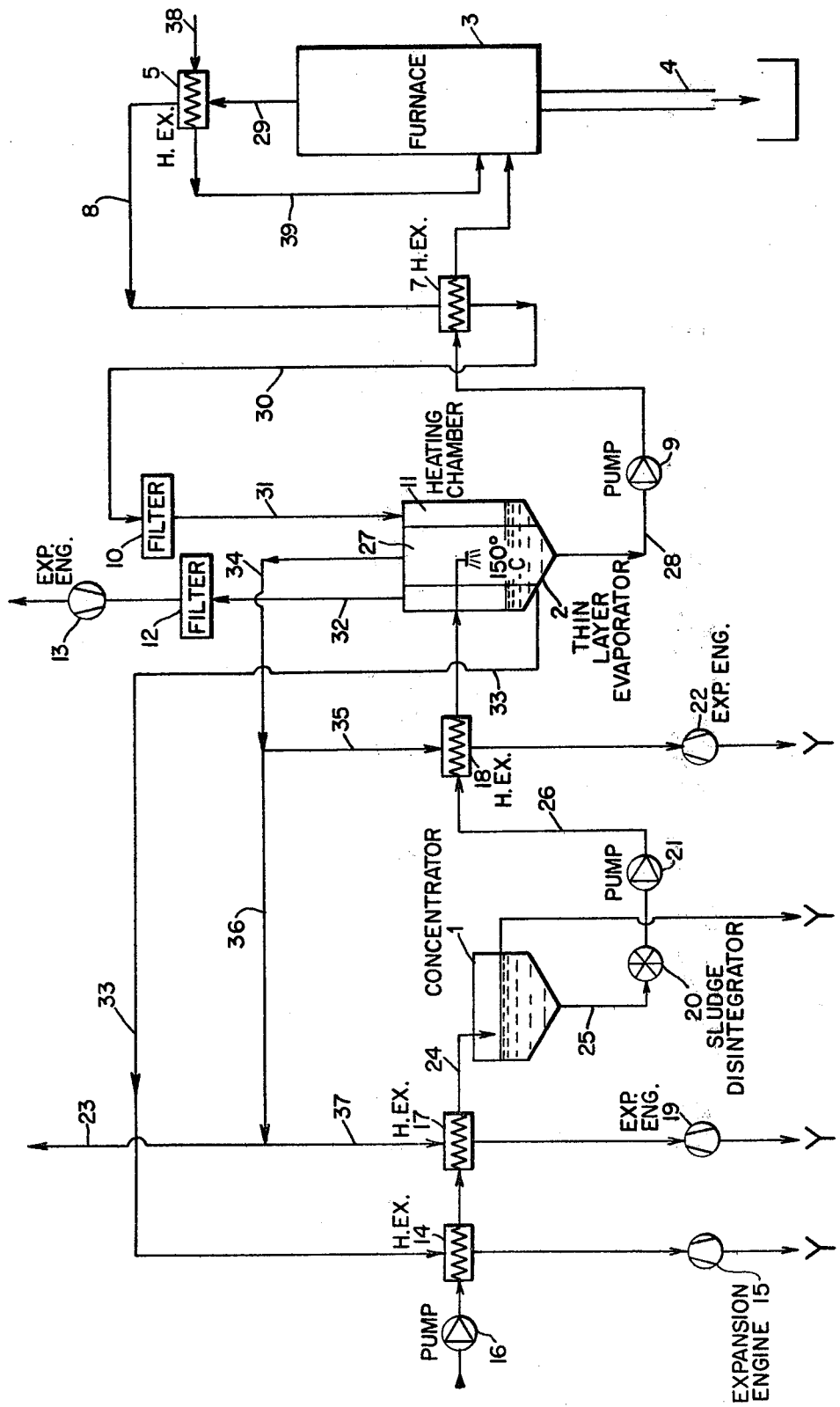

PROCESS FOR THERMIC TREATMENT OF SLUDGES, PARTICULARLY TREATMENT OF CLARIFICATION SLUDGES

This application is a continuation of application Ser. No. 173,257, filed 7/29/80, now abandoned, which is a continuation of application Ser. No. 965,303, filed Dec. 1, 1978, now abandoned.

In known processes for treating clarification sludges, raw sludge or digested sludge is mechanically dehydrated or precipitated by employing filtering aids. This method entails that a large portion of the salts suspended in the clarification sludge, along with the filtered off water, reaches the drainage canal. These salts are lost to the further process of treating the clarification sludge and moreover contribute to undesirable eutrophy of the water. Other disadvantages are that a disposal dump is required to which the dehydrated sludge can be transported, and finally, the possibility of the formation of offensive odors.

It is known to burn dehydrated clarification sludge and to use the waste heat for steam generation, drying or thermoconditioning of the sludge. A disadvantage has been that only a small portion of the energy contained in the dry mass of the sludge is utilized, either upstream or downstream, in components of the plant employed in the sludge combustion process.

Moreover, so-called wet combustion or wet oxidation processes are known in which the combustion of aqueous sludges is effected at elevated temperature and pressure without incineration (flamelessly) and without prior thickening of the sludge; however, below the critical temperature of the water. Due to prevailing thermodynamic conditions in this process, no steam is formed in the reactor itself, so that the liquid reaction product for the purpose of separation from the combustion products, and for the purpose of recovering steam, are first expanded and then subjected to phase separation in a separator connected to the reactor. (Published Patent Application (German) St 2017/IVc/85 c; DE-OS No. 26117340; Meinck, "Industrial Waste Waters", 4th Edition, 1968, pp. 143–144).

Therefore, in the mentioned known process, the reconditioning of the resulting combustion products proves expensive. In most cases they have to be subjected to a cost-intensive aftertreatment due to the hydrocarbons which result from the combustion process.

German published patent application DE-OS No. 2304 273 discloses a process for treatment of sulfide-containing waste waters, in which the waste waters are mixed with a fuel and then converted to synthesis gas at elevated temperature and pressure. The hot synthesis gas emitting from the reactor is quenched, washed and then broken down into its components. (decomposed?)

It is the objective of the invention to create a process in which sludges, which are oxidizable as a dry substance, are treated in their aqueous dispersion in such a way that the energy contained in the sludge, which is released in the oxidation, is almost entirely utilized, so that the total thermic treatment of the sludge, including the thickening, is carried out solely with the heat energy gained from the oxidation of the sludge, without the use of additional fuels. Moreover, the dissolved salts in the untreated sludge are to be retained in the residual water of the dehydrated sludge, during the process of thermic treatment.

In a process for thermic treatment of aqueous sludges containing combustible materials, particularly relating to clarification sludges, in which the sludges are subjected to oxidation at elevated pressure and temperature, this objective is achieved by the process of the invention in that the gas-steam mixture resulting from the oxidation of the sludge, thickens the sludge reaching oxidation by indirect heat exchange, and in that the resultant phases are drawn off separately and are recovered for further use, if desired.

It is to be understood that oxidation in this connection, other than combustion, also means low-temperature carbonization or gasification.

Preferably, the thermic thickening of the sludge is carried out in several stages whereby the steam produced during thickening in one step is used for thickening in a previous step, and the steam which is the product of the thickening, is cooled or condensed in heat exchange with the sludge to be heated. Also, the condensed steam still contains residual heat, which may be further utilized for thermic treatment of the sludge by heat exchange. Energy can even be recovered from media under pressure, with the aid of expansion machines.

Another essential advantage of the instant process is that the thermal energy for the individual steps of the thermic treatment is entirely regained from energy which is released when oxidizing the sludge and furthermore, that this energy is then utilized in its entirety by condensing the steam contained in the steam-gas mixture.

Also, the thermic treatment of the sludge to be thickened, eliminates the use of precipitants. Advantageously, materials for pollutant bonding may be added in order to render the ashes directly depositable or to produce clean gases in the oxidation. The salts dissolved in the sludge water, remaining in the residual water of the thermally thickened sludge, on one hand contribute to the higher salt concentration, while others, i.e. sodium and magnesium compounds act as dissolution agents. This greatly reduces or entirely eliminates the addition of dissolving agents. Moreover, the ashes of the remaining sludge, in this case, are rich in salts, soluble (aufgeschlossen) and thus particularly suitable for fertilizer uses.

A device for carrying out the invention process is characterized in that on the sludge side, a thin layer evaporator is connected to a furnace, such furnace being in communication with the heat chamber of the thin layer evaporator on the gas side.

The invention is further illustrated by way of an example schematically depicted.

Sludge from a clarification plant with 95% water content is directed by pump 16 via heat exchangers 14 and 17 to a preliminary concentrator and/or sieve separator 1, settles on the bottom of the preliminary concentrator and through sludge disintegrator 20, pump 21 and exchanger 18, reaches heating chamber 11' of the thin layer evaporator 2, from whose bottom it is drawn off, and reaches furnace 3 through heat exchanger 7 via pump 9. In the furnace, it is oxidized, i.e. either burned, carbonized at low temperature (degassed) or gasified.

The burned sludge intended for furnace 3 is heated to 200° C. in heat exchanger 7.

The steam-gas mixture passes through heat exchanger 5, line 8, heat exchanger 7 and filter 10 into heating chamber 11 of thin layer evaporator 2 and emits energy to the sludge in heating chamber 11'. Thereby the Steam is condensed while the gas is led to the outside via filter 12 and expansion machine 13.

The condensed steam in heating chamber 11 of thin layer evaporator 2 still having a temperature of approximately 170° C. and a superpressure of approximately 20 bar, then is led to heat exchanger 14 for preheating of the sludge and is then subsequently expanded in expansion machine 15 and diverted.

Filter 10 in line 8 removes ashes, dust and sand from the steam-gas mixture escaping from furnace 3.

The sludge in thin layer evaporator 2 boils at approx. 150° C. and approx. 3 bar superpressure and develops steam which preheats the sludge in heat exchangers 17 and 18 in front of preliminary concentrator 1 and thin layer evaporator 2, respectively, and subsequently is expanded in expansion machines 19 or 22 as steam or condensate. Part of the excess steam may be drawn off in connection 23 for other use.

By heating the sludge, dissolved matter in the sludge water (e.g. albumen) is eliminated so that few or no precipitants are needed. Additionally, material can be supplied to the sludge which bonds the pollutants, sulfur or heavy metal, in particular.

The ashes are drawn off by exhaust 4. All salts of untreated sludge from the clarification plant are still contained in the ashes which, therefore, are particularly suited to agricultural fertilizer use. If one or more dissolution agents are added to the sludge before or during oxidation, phosphates or other fertilizer compounds in the ashes are rendered more water- or citric acid soluble and are well accepted by plants. Also, other salts in the residual water of the sludge effect dissolution.

Conventional fuels, waste oil or general waste can be added to the oxidation process, optimizing the process on one hand, while on the other hand disposing of waste in an economical manner or aiding in its recycling. It is conceivable to subject fuels, waste oil, used tires, garbage or other waste, if necessary, subsequent to preliminary or pretreatment, partly or entirely to the process of the invention. Additionally, it is possible to treat wash liquid from a gas purification plant in a similar manner as the sludges in the process of the invention.

More significant than these technical variations is, however, in this example, the fact of the total combustion of the excess oxygen.

The gas and steam resulting from the sludge residual water in the combustion leave furnace 3, or the oxidation chamber, via line 8, and release part of their heat in heat exchanger 5 to the combustion air, thereby heating it to about 800° C.

Instead of combustion air, oxygen or any other oxygen-air mixture, after preheating in heat exchanger 5, may be blown into furnace 3.

Apart from the combustion, low carbonization (degassing) of the sludge is possible in furnace 3.

The resulting gas, after appropriate cleaning, may be utilized as combustion or synthesis gas.

Also, gasification of the sludge is possible. The sludge with a water content of about 80% is burned in furnace 3 at a pressure of approx. 20 bar and a temperature of approx. 1000° C. resulting in the formation of gases, steam and ashes.

Furnace 3 is constructed to be pressure-resistant. It may be, for example, a muffle furnace, slag tap furnace (Schmelzkammerofen), blast furnace or fluidized bed furnace. The fluidized bed could be sand or granulated ashes.

It is to be understood that the concept of the invention is not limited to the example described, but also comprises treatment plants for other sludges, e.g., industrial sludges containing matter combustible in its dry state or in a slurry, or to sludges to which combustible matter is added.

I claim:

1. An energy efficient process for thermic treatment of aqueous clarification sludge which contains oxidizable matter comprising pumping the sludge, flowing the sludge through a first heat exchanger and heating the sludge, flowing the sludge through a second heat exchanger and further heating the sludge, flowing the further heated sludge into a concentrator, settling concentrated sludge in the concentrator, removing heated water and dissolved materials from the concentrator, withdrawing concentrated sludge from the concentrator, disintegrating the concentrated sludge with a sludge disintegrator, pumping the disintegrated concentrated sludge to a higher pressure, heating the concentrated disintegrated sludge in a third heat exchanger, spraying the heated and pressurized concentrated and disintegrated sludge into a first heating chamber of a thin layer evaporator and evaporating the heated and pressurized disintegrated concentrated sludge in the first heating chamber of the thin layer evaporator, withdrawing a second portion of the sludge in the form of heated and pressurized steam from the first heating chamber of the thin layer evaporator, withdrawing a remainder of the evaporated heated pressurized concentrated and disintegrated sludge from the thin layer evaporator and increasing pressure of the remainder of the sludge with a third pump, heating the remainder of the sludge under increased pressure in a fourth heat exchanger and feeding the heated increased pressure sludge remainder to a furnace, introducing oxygen through a fifth heat exchanger, heating the oxygen and introducing the heated oxygen from the fifth heat exchanger to the furnace, removing ash from the furnace, and withdrawing a third steam and gas mixture from the furnace, passing the steam and gas mixture from the furnace through the fifth heat exchanger and heating the incoming oxygen, passing the steam and gas mixture from the fifth heat exchanger to the fourth heat exchanger and heating the pressurized sludge remainder on its way into the furnace, passing the steam and gas mixture through a filter and removing ashes, dust and sand, passing the filtered steam and gas mixture from the filter into a second heat chamber of the thin layer evaporator and heating the heated pressurized disintegrated concentrated sludge in the first chamber of the thin layer evaporator, removing gas from the second heat chamber of the thin layer evaporator, separately removing condensed steam from the second chamber of the thin layer evaporator, flowing the condensed steam through the first heat exchanger to heat the incoming aqueous sludge, flowing the steam withdrawn from the sludge in the first chamber of the thin layer evaporator through the second heat exchanger and further heating the incoming sludge, flowing the steam generated from the sludge in the first chamber of the thin layer evaporator through the third heat exchanger and heating the pressurized concentrated and disintegrated sludge.

2. The process of claim 1 comprising flowing the steam from the first heat exchanger into a first expansion engine and expanding the steam and withdrawing work from the steam, flowing the steam from the second heat exchanger through a second expanding engine and extracting work, flowing the steam from the third heat exchanger through a third expansion engine and extracting work and flowing the gas from the second chamber of the thin layer evaporator through a fourth expansion engine and extracting work.

* * * * *